(12) United States Patent
Hilpert et al.

(10) Patent No.: US 10,113,650 B2
(45) Date of Patent: Oct. 30, 2018

(54) DUAL SEAT VALVE

(71) Applicant: Engip, LLC, Houston, TX (US)

(72) Inventors: Clifford L. Hilpert, Conroe, TX (US); Jeffrey Hilpert, Conroe, TX (US)

(73) Assignee: Engip, LLC, Conroe, TX (US)

( * ) Notice: Subject to any disclaimer, the term of this patent is extended or adjusted under 35 U.S.C. 154(b) by 6 days.

(21) Appl. No.: 14/993,864

(22) Filed: Jan. 12, 2016

(65) Prior Publication Data

US 2016/0123475 A1 May 5, 2016

(51) Int. Cl.
| | | |
|---|---|---|
| *F16K 17/40* | (2006.01) | |
| *F16K 1/44* | (2006.01) | |
| *F16K 31/122* | (2006.01) | |
| *F16K 17/16* | (2006.01) | |

(52) U.S. Cl.
CPC ............ *F16K 1/443* (2013.01); *F16K 17/16* (2013.01); *F16K 31/122* (2013.01)

(58) Field of Classification Search
CPC ......... F16K 1/443; F16K 31/122; F16K 17/16
USPC ....... 137/68.19, 528, 538, 628, 614.16, 219, 137/285, 304, 512.2, 513, 514.3, 514.5, 137/516.25, 516.27; 251/157, 333
See application file for complete search history.

(56) References Cited

U.S. PATENT DOCUMENTS

| | | | | |
|---|---|---|---|---|
| 676,580 A * | 6/1901 | French | ...................... | F16K 1/34 251/334 |
| 2,163,472 A * | 6/1939 | Shimer | ............... | F04B 53/1027 137/516.29 |
| 3,194,268 A * | 7/1965 | Vicenzi | ................... | F16K 31/10 137/614.11 |
| 3,996,965 A * | 12/1976 | Peters | ...................... | F16K 17/00 137/458 |
| 4,254,792 A * | 3/1981 | Schadel | .................. | F16K 1/446 137/240 |
| 4,360,039 A * | 11/1982 | Jeppsson | ................. | F16K 1/385 137/240 |
| 4,368,753 A * | 1/1983 | Brakelmann | ........... | F16K 1/446 134/166 C |
| 4,552,167 A * | 11/1985 | Brakelmann | ........... | B67C 3/001 134/166 C |
| 4,605,035 A * | 8/1986 | Rasmussen | ............. | F16K 1/446 134/166 C |
| 4,842,004 A * | 6/1989 | Steinman | ............... | F16K 17/162 137/454.2 |
| 5,193,577 A * | 3/1993 | de Koning | ............ | F04B 53/102 137/516.29 |
| 5,960,823 A * | 10/1999 | Wilkins | ................... | F16K 24/06 137/516.25 |
| 6,230,742 B1 * | 5/2001 | Bircann | .................. | F16K 1/443 137/625.34 |
| 6,295,975 B1 * | 10/2001 | Yew | .................... | F02M 63/0022 123/568.2 |
| 6,328,542 B1 | 12/2001 | Serafin | | |
| 6,330,880 B1 * | 12/2001 | Okada | .................... | F02M 26/69 123/568.2 |

(Continued)

*Primary Examiner* — Minh Le
(74) *Attorney, Agent, or Firm* — Tumey L.L.P.

(57) ABSTRACT

A dual seat valve assembly includes a first valve and a concentric second valve which together form a tight seal valve assembly. The valves open and close sequentially. A quick disconnect rupture disc assembly may be used in conjunction with the valve assembly to provide a required safety feature for testing high pressure fluid ruptures that include a dump valve.

4 Claims, 5 Drawing Sheets

(56) References Cited

U.S. PATENT DOCUMENTS

| | | | | |
|---|---|---|---|---|
| 6,401,753 | B2* | 6/2002 | Neu | F16K 1/443 |
| | | | | 137/625.36 |
| 6,763,620 | B1* | 7/2004 | Voss | D06F 75/18 |
| | | | | 38/77.83 |
| 6,845,965 | B2* | 1/2005 | Lanting | F16J 15/48 |
| | | | | 251/175 |
| 6,951,209 | B2* | 10/2005 | Yanase | F02M 25/0836 |
| | | | | 123/516 |
| 6,959,718 | B2* | 11/2005 | Kayahara | F16K 1/36 |
| | | | | 137/15.01 |
| 7,086,636 | B2* | 8/2006 | Telep | F02M 26/69 |
| | | | | 123/568.24 |
| 7,114,516 | B2* | 10/2006 | Ito | F16K 15/066 |
| | | | | 137/487.5 |
| 7,347,221 | B2* | 3/2008 | Berger | F16K 1/443 |
| | | | | 137/614.18 |
| 8,950,423 | B2* | 2/2015 | Du | F16K 1/446 |
| | | | | 137/312 |
| 2013/0111985 | A1 | 5/2013 | Veeningen | |
| 2016/0076654 | A1* | 3/2016 | Nielsen | F16K 1/446 |
| | | | | 137/312 |

* cited by examiner

DUAL SEAT VALVE

BACKGROUND OF THE INVENTION

Field of the Invention

The invention relates to a valve for regulating the flow of fluid. The valve may be used as a dump valve in a high pressure fluid system to relieve pressure when desired. It can also be used in any fluid system to provide an extremely tight seal with virtually no leakage, a condition sometimes referred to as a "bubble tight seal."

Background of the Invention

A bubble tight seal is very desirable, and in some cases required, for pressure decay testing. Currently available technology utilizes highly polished metal to metal seat assemblies, or grease injectable sealing features. Valves using highly polished seat assemblies, can be made to have very small leaks, but not "bubble tight." Additionally these valves are very susceptible to damage of their highly polished seat assemblies. Another current technology utilizes precision seat assemblies, not highly polished, and a special grease that seals the imperfections of the precision seat assemblies. These valves work as "bubble tight" but required constant greasing to keep them operating properly.

When performing a hydrostatic test it is normally a requirement to have a rupture disc in fluid communication with the high pressure fluid that has a rupture rating of not more than 1.5 times the specified hydrostatic test pressure. This is a difficult requirement for most hydrostatic test system to comply with. To comply you are required to dissemble the rupture disc body, remove the currently installed rupture disc, replace it with the appropriate rupture disc, and then reassemble the rupture disc body. Additionally, the old certification tag must be removed from the rupture disc body and the new tag installed. Having the certification tag separately attached, usually by a safety wire, can be problematic. This system can lead to a rupture disc that is not properly identified because it is permanently attached to the rupture disc body.

Consequently there is a need for a valve that is not highly susceptible to damage and that does not require constant greasing for proper operation, also there is a need for a simple and less burdensome manner for certifying that a correct burst disc was utilized during the testing process.

BRIEF SUMMARY OF SOME OF THE INVENTION

These and other needs in the art are addressed in one embodiment by a valve that includes two valve seats. A fluid pressure actuated piston has a first valve surface that cooperates with a first valve seat and carries a plunger that is axially movable within the piston.

The plunger has a second valve surface that engages a second seat in the valve body. As the valve is opened, the piston initially separates from the first valve seat while the plunger piston still engages the second valve seat. As the piston is further moved away from the valve seats, the second valve surface disengages from the second valve seat. The first valve seat is an elastomeric ring member. Thus as the valve is opened, the piston disengages from the elastomeric ring before the plunger disengages, thereby providing protection for the elastomer from extrusion and erosion.

The invention also includes the provision of a rupture disc carrying unit that can be quickly disconnected from the valve by virtue of a quick disconnect coupling. The unit may include a permanently attached certification tag. The unit also is color coded for easy visual identification of the rupture disc pressure.

BRIEF DESCRIPTION OF THE DRAWINGS

For a detailed description of the preferred embodiments of the invention, reference will now be made to the accompanying drawings in which.

DETAILED DESCRIPTION OF THE INVENTION

Figure 1:
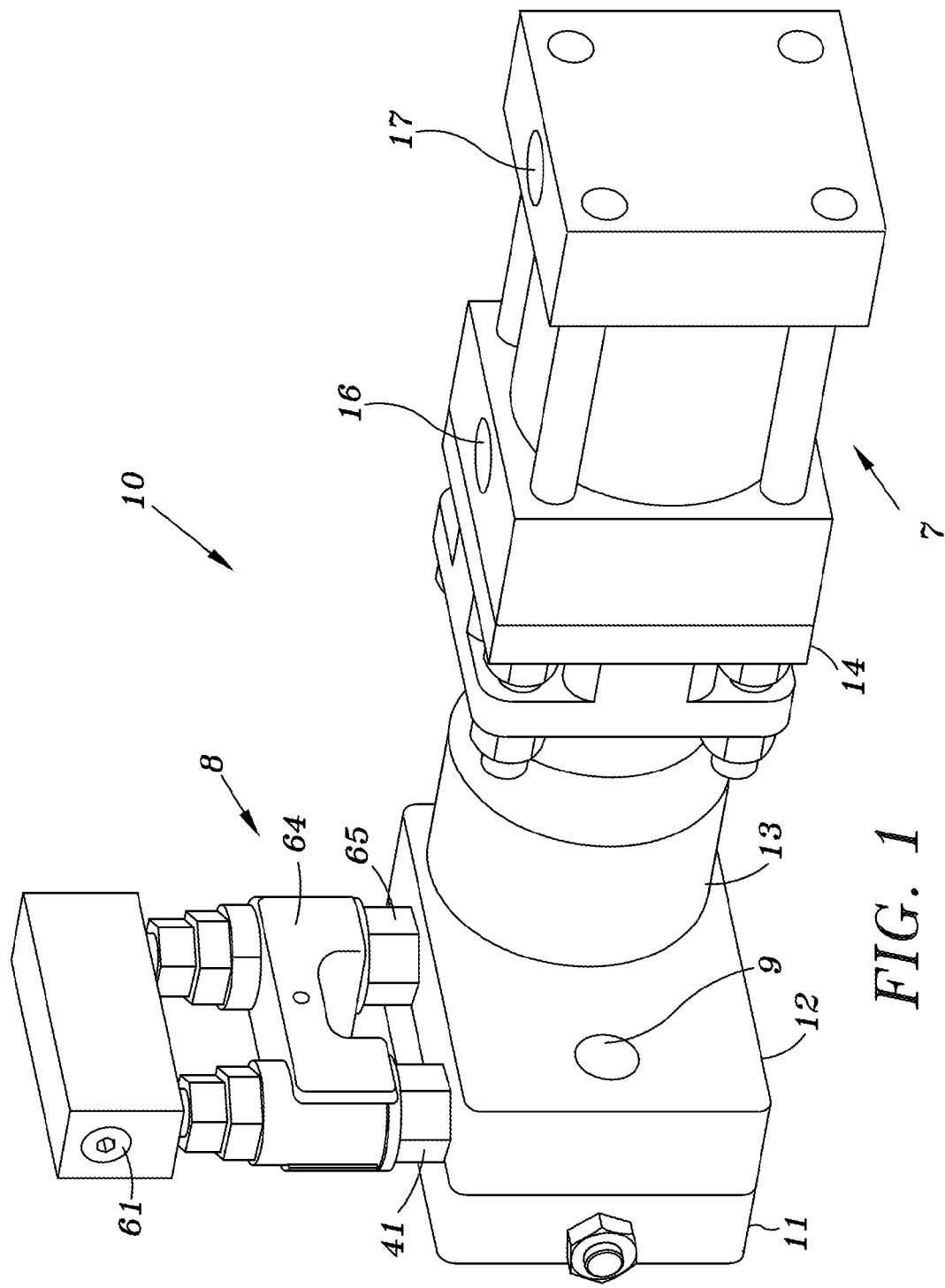
FIG. 1 is a perspective view of an embodiment of the invention.
Figure 2:
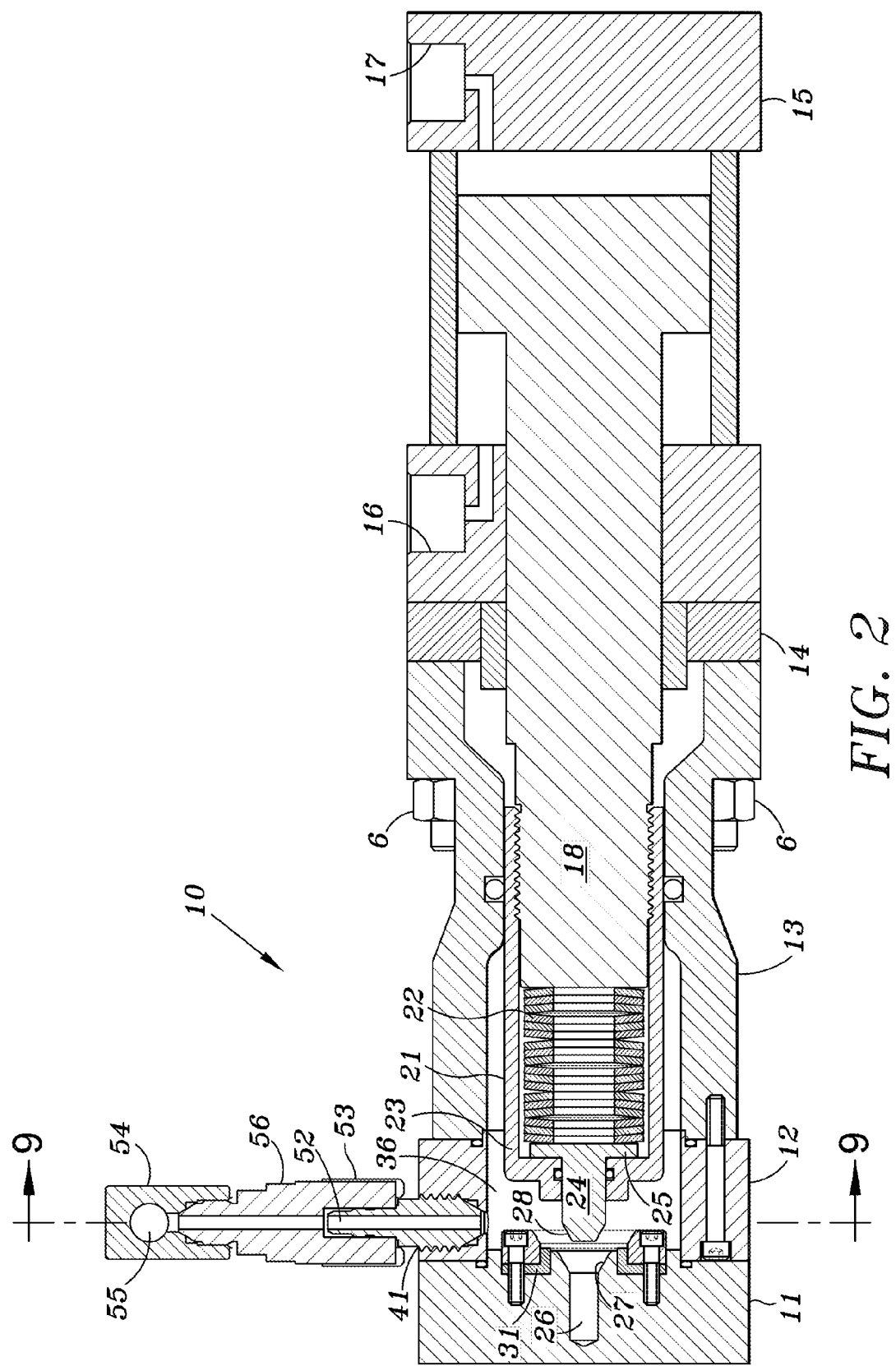
FIG. 2 is a cross sectional view of an embodiment of the invention.

As shown in perception in FIG. 1, an embodiment of the invention of this application includes front housing members 11, 12 a central housing member 13, and a hydraulic actuating assembly 7 which includes fluid inlets and outlets 16, 17 for moving a piston 18 housed within the actuating assembly 7 as shown in FIG. 2.

A quick disconnect rupture disc assembly 8 is removable attached to the front portion of the valve and will be discussed in greater detail below.

Figure 4:
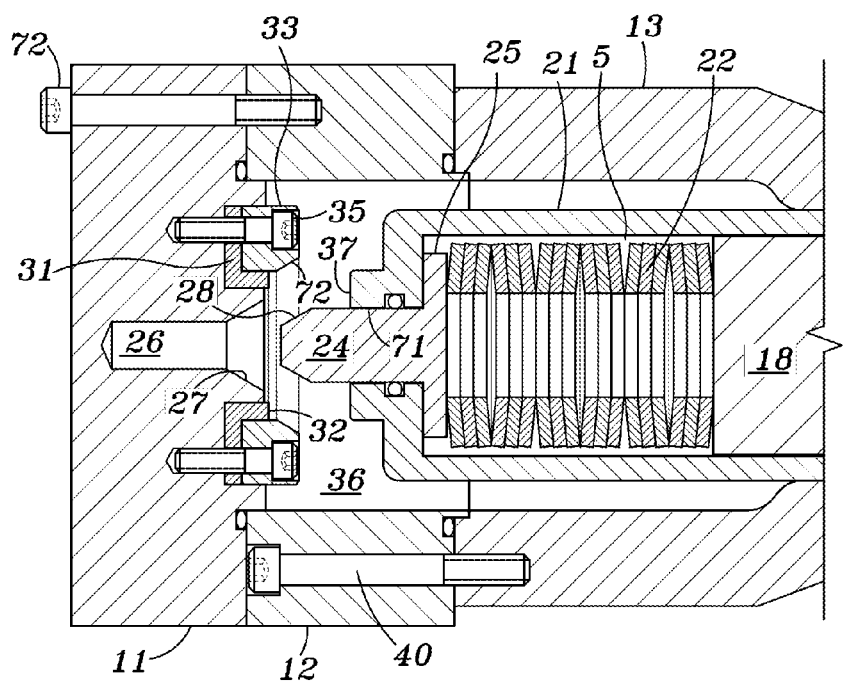
FIG. 4 is a cross sectional view of the front end of the valve shown in FIG. 1 in the open position

Housing portions 11, 12, and 13 are bolted together as shown in FIG. 4 by a plurality of bolts 40 and 72.

Actuating assembly 7 and a spacer plate 14 are secured to housing 13 via a plurality of bolts 6.

The interior of housing portion 11 is provided with a blind bore 26 which includes a first valve seat 27. An annular ring member 31 surrounds valve seat 27 and includes a second valve seat 32 as shown in FIG. 4. Ring member 31 is secured to housing portion 11 by a retainer ring 33 having a beveled section 72 and a plurality of bolts 35. Ring member 31 may be formed of an elastomeric material such as polyurethane.

Figure 5:
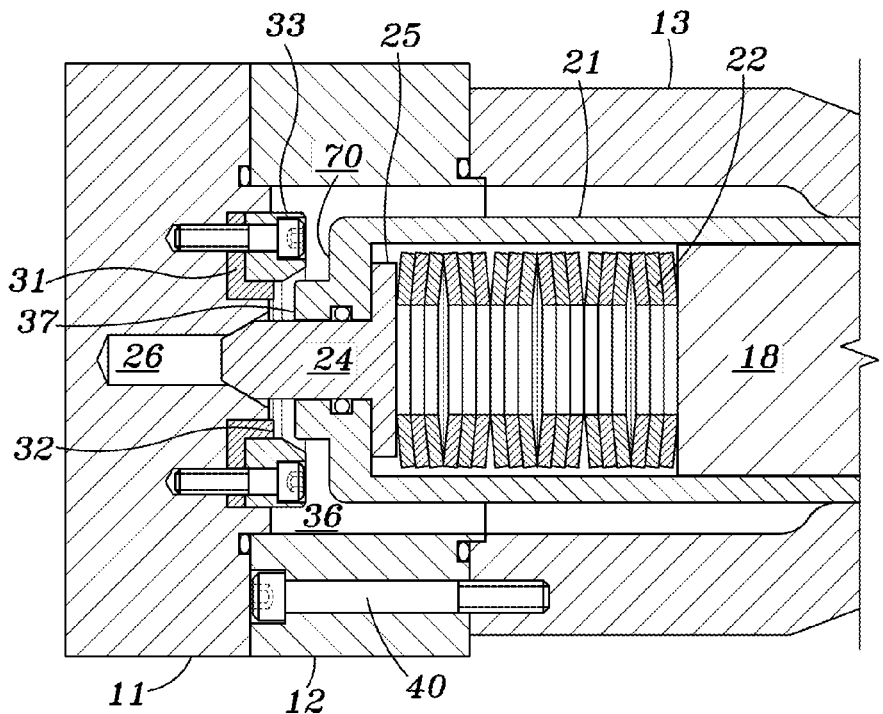
FIG. 5 is a cross sectional view of the front end of the valve shown in FIG. 1 with one of the valve seats in the closed position.

A hollow sleeve member 21 having a front surface 70 shown in FIG. 5 and an aperture 71 in the front surface is threadably attached to piston 18.

Figure 6:
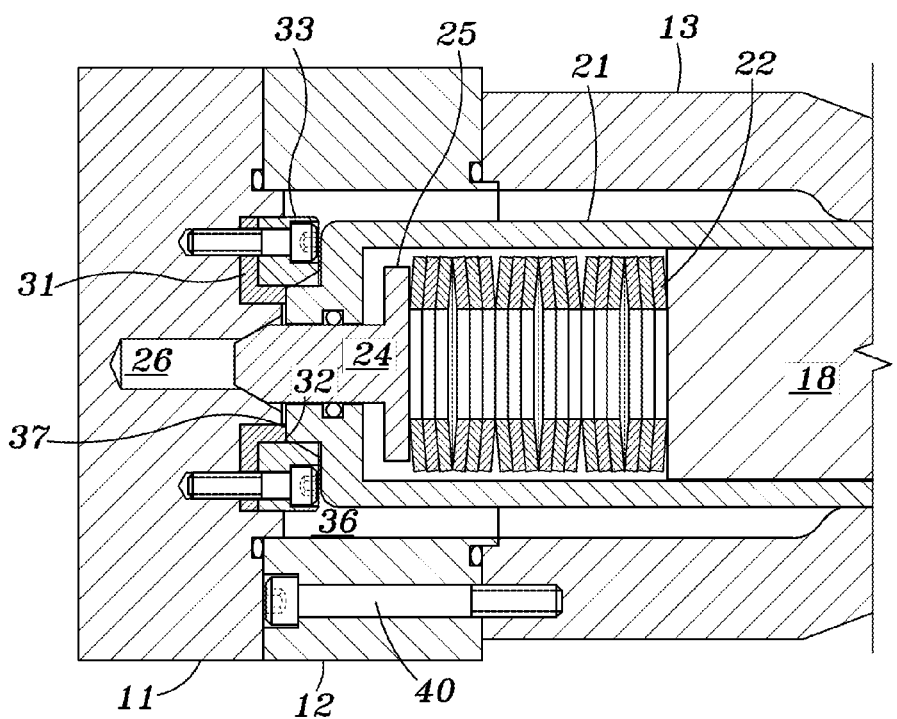
FIG. 6 is a cross sectional view of the front end of the valve shown in FIG. 1 with both valve seats in the closed position.

Front surface 70 includes a forward facing valve surface 37 which is adapted to engage valve surface 32 of ring member 31 as shown in FIGS. 5 and 6.

A plunger 24 is movably positioned within a chamber 5 located within sleeve 21 and extends through aperture 71. A plurality of Bellville springs 22 normally bias flange 25 against the inner forward surface of sleeve portion 70.

Plunger 24 includes a frusto-conical valve surface 28 which is adapted to mate with first valve seat 27, when the valve is in a closed position. Plunger 24 and valve seat 27 may be made from stainless steel.

Second housing portion 12 is positioned between housing portions 11 and 13 and includes an interior chamber 36.

Figure 3:
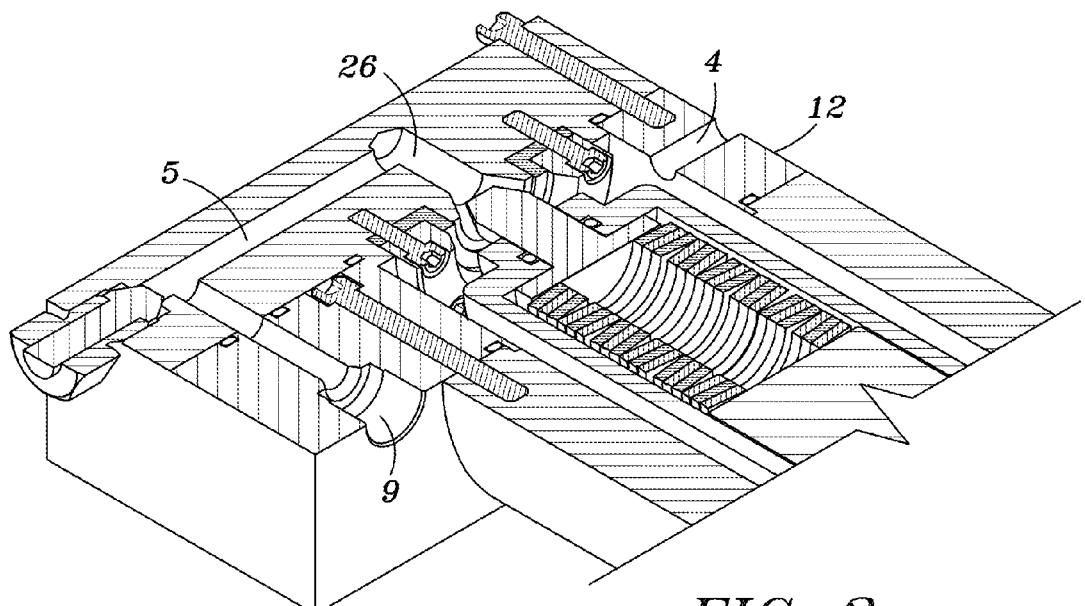
FIG. 3 is a perspective cross sectional view of the front end of the valve shown in FIG. 1.

As shown in FIG. 3, high pressure fluid enters the valve through an inlet 9 and passageway 5. In the closed position shown in FIG. 6, fluid flow is blocked by the first valve seat and surfaces 27, 28 and second valve seat and surfaces 32, 37.

When it is desired to open the valve, pressurized fluid is applied through inlet 16 in the actuator assembly 7 which moves piston 18 to the right as shown in FIG. 5. Movement of piston 18 separates valve seat 32 and second valve surface 37 as shown in FIG. 5. However, springs 22 will maintain valve seat 27 and first valve surface 28 in contact with each other. Springs 22 are compressed initially when the valve is moved to the closed position as shown in FIG. 6. To close the valve assembly, piston 18 is moved by fluid pressure to first cause valve seat 27 and valve surface 28 to engage. Further movement of the piston 18 to the left as shown in FIG. 6 will cause plunger 24 to engage surface 27 thereby forcing plunger 24 to compress springs 22.

Thus, as the piston 18 is retracted under fluid pressure, valve seat 32 and valve surface 37 will separate but springs 22 will maintain plunger 24 and valve seat 27 and first valve surface 28 together. As the piston 18 moves further to the right as shown in FIG. 4, valve surface 28 will move from valve seat 27 and the valve is in the fully open position. Fluid exits chamber 36 via an outlet passageway 4 in housing portion 12 as shown in FIG. 3. When the dump valve is opened surface 37 will disengage first before the plunger 24 thereby protecting the elastomeric valve seat 31 from extrusion and erosion.

Figure 7:
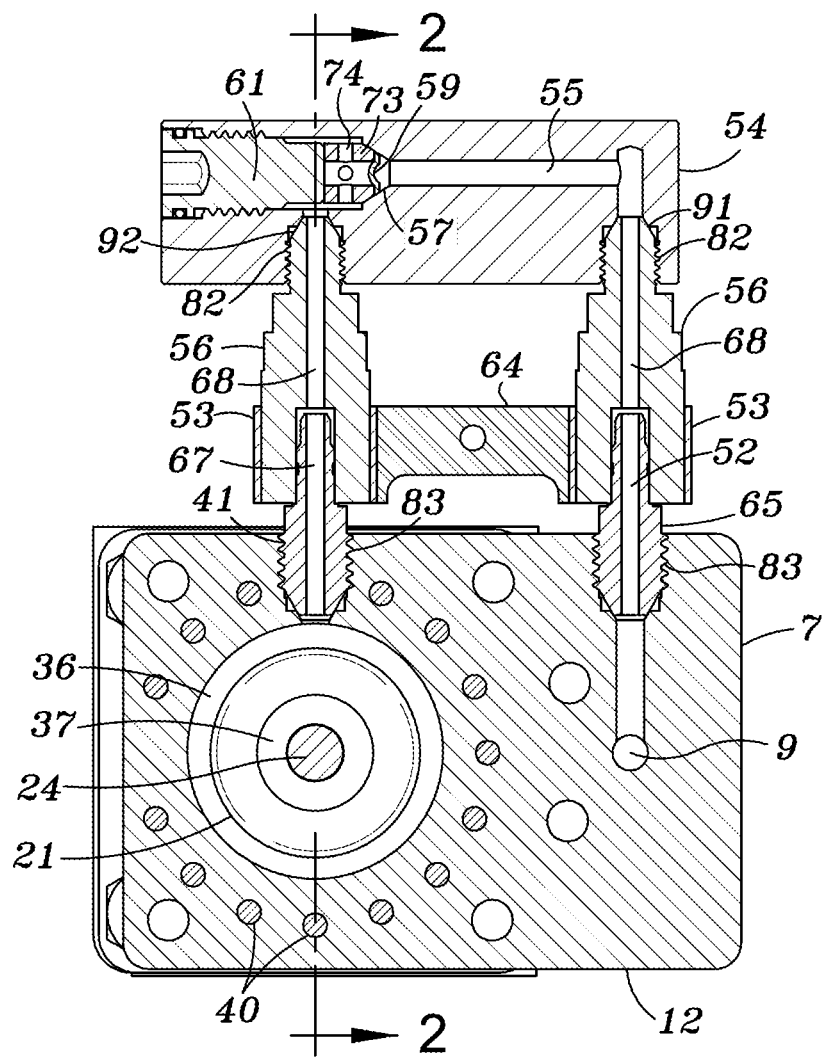
FIG. 7 is a cross sectional view of the quick disconnect mechanism for the rupture disc assembly attached to the valve shown in FIG. 1.

According to a further aspect of the invention a quick disconnect rupture disc assembly 8 is attached to a top potion of housing portion 12 as shown in FIG. 7. The assembly includes a body 54 having a fluid inlet 91 and a fluid outlet 92.

As shown in FIG. 7, the top portion of housing 7 includes a first fitting 65 which has an interior passageway 52 which is in fluid communication with inlet port 9.

The top portion of housing 7 includes a second fitting 41 which is in fluid communication with chamber 36 via a passageway 67.

A pair of quick disconnect members 56 are removably connected to fittings 65 and 41. Each disconnect member includes a sleeve 53 which is axially moveable to disconnect members 56 from fittings 41, 65 in a manner known in the art. See, for example, U.S. Pat. No. 3,404,705 the entire contents of which incorporated herein by reference thereto. Any one of the known quick disconnect mechanisms known in the art may be used that include an axially movable outer sleeve. Sleeves 53 are rigidly attached to a handle 64.

The upper portion of quick disconnect members 56 are connected to a rupture disc housing 54 which includes a passageway 55 in fluid communication with passageway 68.

A rupture disc 59 is held in place by a shoulder 57 and plug 73 and is located within passageway 55. Plug 73 passages 74 and is held in place by a second plug 61.

A plurality of housing 54 with different pressure rated rupture discs may be provided. The rupture disc assembly may be quickly connected to the valve body by grasping handle 64 and moving the cylindrical sleeves 53 in an upward direction.

Coupling member 56 may then be placed over fittings 41 and 63 and moved downwardly. Sleeves 53 can them be moved downwardly to connect members 56 to fittings 41 and 65.

To disconnect the quick disconnect assembly from the valve, handle 64 is grasped by the user and sleeves 53 can be moved upwardly to disconnect members 56 from fittings 41 and 65 in a known manner.

If pressure in inlet 9 becomes too high, rupture disc 59 will burst and fluid will flow from inlet 9 through passageways 68, 55, 74, and 67 into chamber 36. From chamber 36 fluid will exit through outlet 4.

What is claimed is:
1. A dual seat valve assembly comprising:
a) a housing having a fluid inlet and a fluid outlet,
b) a first valve seat and an axially movable plunger having a first valve surface located within the housing together forming a first valve,
c) a second valve seat concentric with the first valve seat and an axially movable second valve surface adapted to engage the second valve seat thereby together forming a second valve, and
d) a rupture disc quick disconnect assembly attached to the housing, and having first and second quick disconnect couplings that are connectable to first and second fittings on the housing.
2. The dual seat valve assembly of claim 1 wherein the first and second fittings are fluidly connected to the fluid inlet and fluid outlet respectfully, and a rupture disc positioned within a flow path extending between the first and second quick connect coupling.
3. The dual seat valve assembly of claim 1 wherein the first and second quick disconnect couplings include an axially movable sleeve, and a handle connected to both sleeves.
4. A quick disconnect rupture disc assembly comprising:
a) a body having a fluid inlet and a fluid outlet with a passageway connected between the fluid inlet and fluid outlet,
b) a rupture disc located in the passageway,
c) a pair of quick disconnect couplings attached to the fluid inlet and outlet, the quick disconnect couplings each including an axially movable sleeve,
d) a handle connected to each of the axially movable sleeves for manually disconnecting the quick disconnect couplings.

\* \* \* \* \*